US011366832B2

(12) United States Patent
Woodmansee et al.

(10) Patent No.: US 11,366,832 B2
(45) Date of Patent: Jun. 21, 2022

(54) CLOUD SERVICES MANAGEMENT

(71) Applicant: Citrix Systems, Inc., Fort Lauderdale, FL (US)

(72) Inventors: Kevin Woodmansee, Lighthouse Point, FL (US); Leo C. Singleton, IV, Fort Lauderdale, FL (US); Alan Goldman, Tampa, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 544 days.

(21) Appl. No.: 15/661,395

(22) Filed: Jul. 27, 2017

(65) Prior Publication Data

US 2019/0034513 A1 Jan. 31, 2019

(51) Int. Cl.
| | |
|---|---|
| *G06F 16/28* | (2019.01) |
| *H04L 67/10* | (2022.01) |
| *H04L 41/50* | (2022.01) |
| *G06F 16/27* | (2019.01) |
| *G06F 16/22* | (2019.01) |
| *G06F 8/60* | (2018.01) |
| *G06F 8/65* | (2018.01) |
| *H04L 12/12* | (2006.01) |
| *H04L 67/306* | (2022.01) |

(52) U.S. Cl.
CPC .............. *G06F 16/285* (2019.01); *G06F 8/60* (2013.01); *G06F 8/65* (2013.01); *G06F 16/2255* (2019.01); *G06F 16/27* (2019.01); *G06F 16/282* (2019.01); *H04L 12/12* (2013.01); *H04L 41/50* (2013.01); *H04L 67/10* (2013.01); *H04L 67/306* (2013.01)

(58) Field of Classification Search
CPC .... G06F 16/285; G06F 16/27; G06F 16/2255; G06F 16/282; G06F 8/60; G06F 8/65; H04L 12/12; H04L 41/50; H04L 67/10; H04L 67/306
See application file for complete search history.

(56) References Cited

U.S. PATENT DOCUMENTS

| | | | | |
|---|---|---|---|---|
| 6,718,386 | B1* | 4/2004 | Hanfland | G06F 3/04847 |
| | | | | 709/225 |
| 8,788,407 | B1* | 7/2014 | Singh | G06F 16/335 |
| | | | | 705/38 |
| 2007/0282800 | A1* | 12/2007 | England | G06F 21/6281 |
| 2009/0307596 | A1* | 12/2009 | Allot | H04L 41/5067 |
| | | | | 715/736 |
| 2010/0067390 | A1* | 3/2010 | Pereira Valente | H04L 41/22 |
| | | | | 370/252 |
| 2015/0052124 | A1* | 2/2015 | Pegg | G06F 16/29 |
| | | | | 707/724 |
| 2016/0291955 | A1* | 10/2016 | Axtell | G06F 21/629 |
| 2017/0164198 | A1* | 6/2017 | Furuichi | H04W 4/70 |
| 2017/0264507 | A1* | 9/2017 | Kako | H04L 67/10 |
| 2019/0208371 | A1* | 7/2019 | Morisset | G06Q 10/06 |

\* cited by examiner

*Primary Examiner* — Vaishali Shah
(74) *Attorney, Agent, or Firm* — Banner & Witcoff, Ltd.

(57) ABSTRACT

Methods and systems for managing cloud services are disclosed herein. According to various aspects of the disclosure, a number of users of cloud services can be organized in to a plurality of hierarchically organized groups. A feature associated with a cloud resource can then be enabled for a first group of users. An enablement value can then be calculated for a member of a second group of users and the feature can be enabled for that member of the second group of users based on the calculated enablement value.

16 Claims, 13 Drawing Sheets

CLOUD SERVICES MANAGEMENT

FIELD

Aspects described herein generally relate to managing the rollout and/or implementation of features for various customers and/or users in a cloud-based system. In particular, the systems and methods described can be used to selectively enable features and/or aspects of various cloud services for one or more customers and/or users of a cloud-based system.

BACKGROUND

Providers of cloud services offer their customers a variety of resources and software for use on their cloud-based systems. From time to time most providers will offer updates to their resources and software that roll out new features or update existing features with, for instance, new and improved settings or functionality. For a variety of reasons, however, a cloud service provider may wish to provide the new features or updates selectively to its customers over time. Furthermore, a new feature may only be applicable to certain editions of a product or a provider may want to limit the roll out of a product based on license agreements.

Presently there is no good ways for a provider of cloud services to selectively enable a new and/or updated feature for various customers according to the preferences of those customers and the provider. Improvements are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and method of managing cloud services offered in a cloud computing environment.

According to embodiments, a method of managing cloud services is provided. The method may organize a plurality of users and/or clients of the cloud services provider into a plurality of groups. A feature associated with a resource may be enabled for users in a first group and then, subsequently, the feature may be enabled for a member of a second group based on an enablement value of the member of the second group. The subsequent enablement may comprise determining that the enablement value of the member of the second group is below a threshold value associated with the second group. According to some embodiments, the subsequent enablement of the feature of the member of the second group occurs only after every member of the first group has been enabled. In some embodiments, the groups are arranged in a hierarchy and a feature must be enabled for all members of a higher hierarchical level before being enabled for a subsequent or lower hierarchal level.

In some embodiments, the method may further comprise adjusting the threshold value associated with the second group and enabling an additional member of the second group based on a comparison of an enablement value of the additional member of the second group to the adjusted threshold value. Additionally, the threshold value may be re-adjusted for the second feature and the feature of the additional member of the second group can then be disabled based on the re-adjusted threshold. In various embodiments, the enablement value for a member of a group can be unique to the member of the group and may comprise a randomly generated number and/or be calculated based on a value of a member identification of the member and a feature identification of the feature. In some embodiments, the enablement value is calculated based on a hash of the member identification and the feature identification.

According to some embodiments, a method of managing cloud services is provided. The method includes executing, by a computing device, an instance of a software component that comprises a feature. The method may then determine whether to enable the feature for the executed instance of the software and then enable and/or disable the feature for the instance of the software component based on the determination. In some embodiments, the method may include querying a remote system to determine whether the feature is enabled. The method may also include calculating an enablement value based on information specific to the instance of the software component and comparing the enablement value to a threshold value. For instance, the method may enable the feature when the enablement value is below the threshold value and disable the feature when the feature is above the threshold value. Additionally, in some embodiments, the method may determine whether to enable a feature based on an edition associated with the instance of the software component and/or whether a customer associated with the instance of the software component is a member of a hierarchical group. The method may also determine whether to enable a feature based on rollout settings associated with the feature.

According to some embodiments, systems and apparatus are provided. The system may comprise one or more processors that are configured to execute an instance of a software component that comprises a feature. The one or more processor may then determine whether to enable the feature for the executed instance of the software and then enable and/or disable the feature for the instance of the software component based on the determination.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
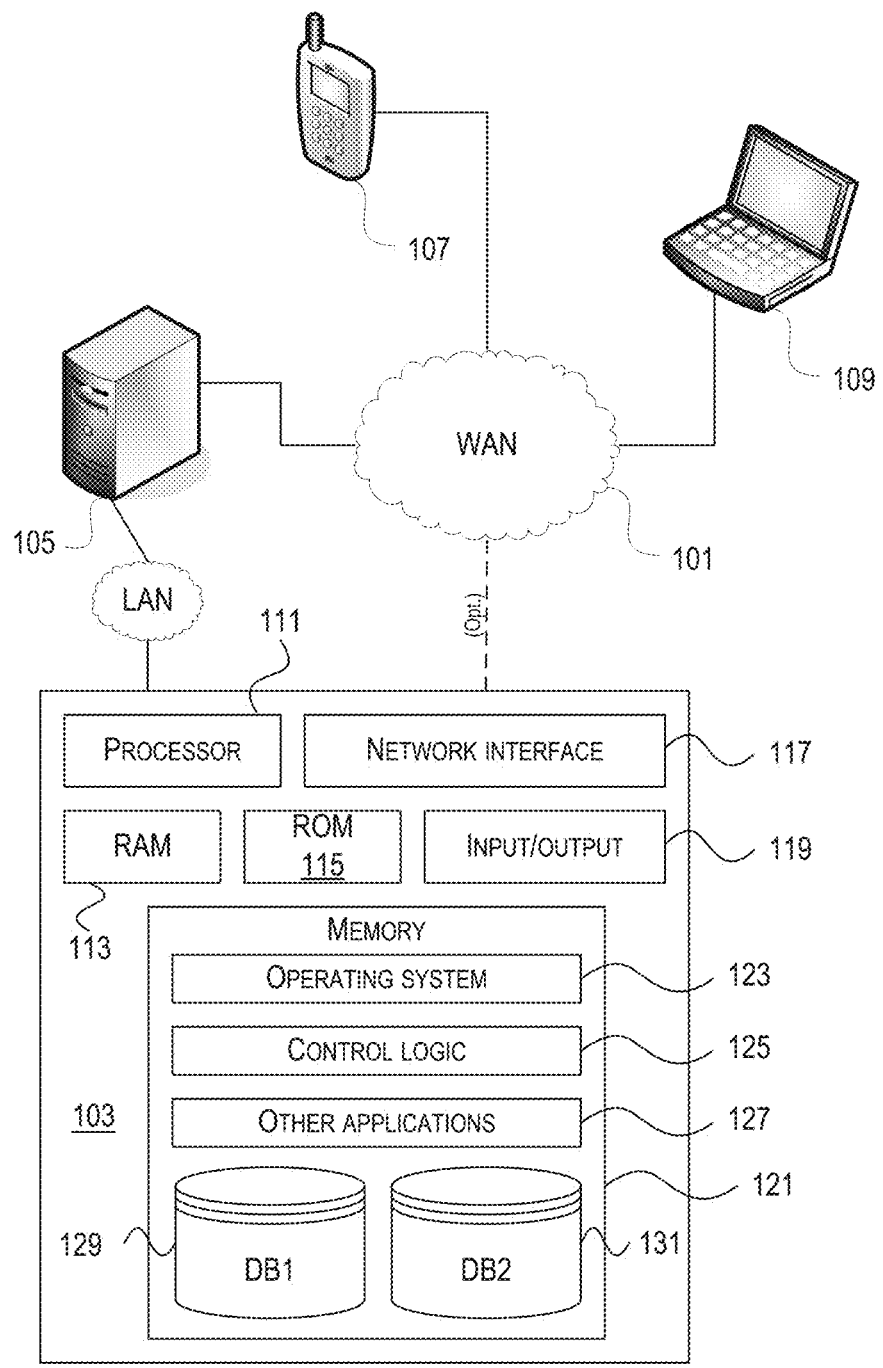
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
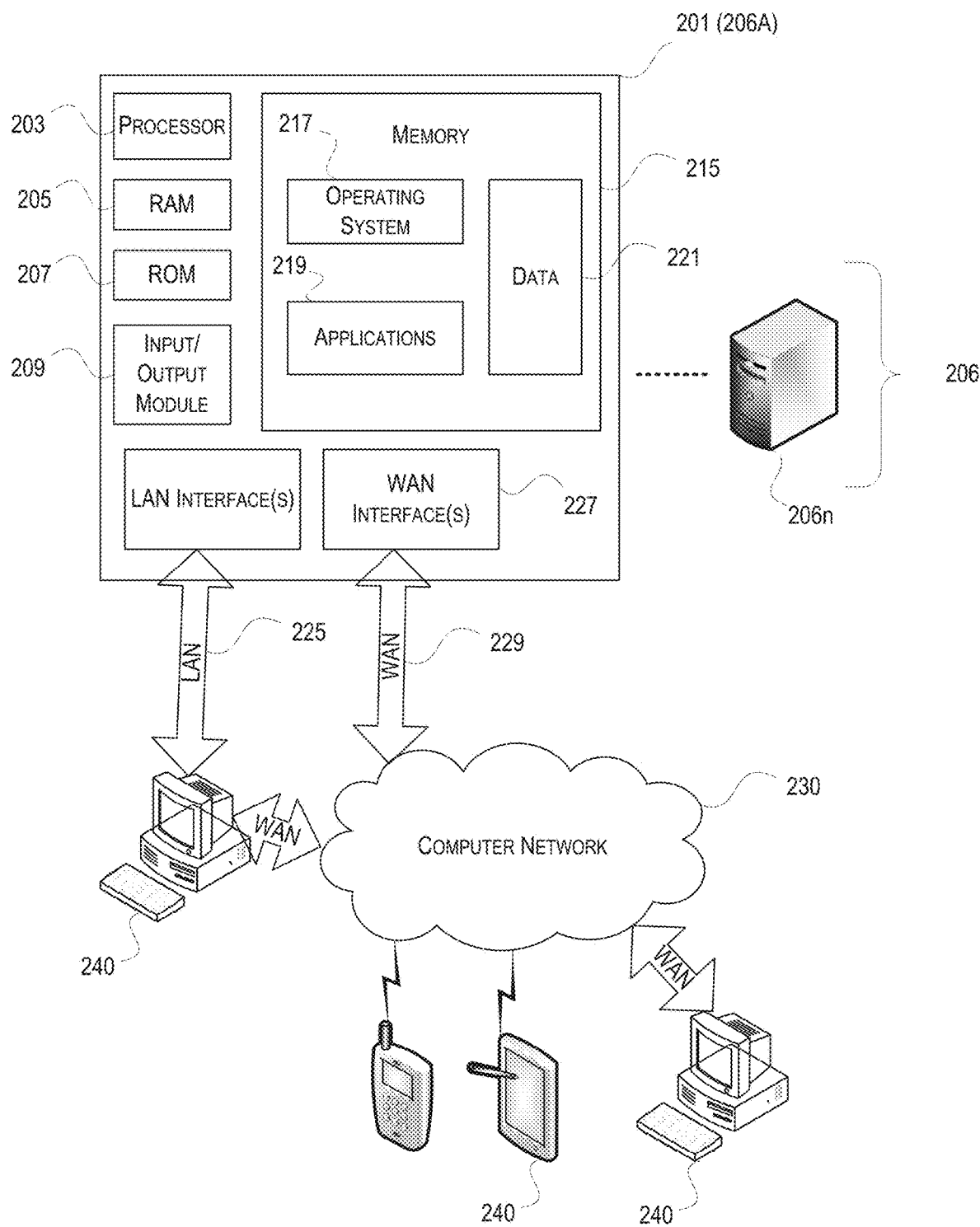
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206*a* in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206*a*-206*n* (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
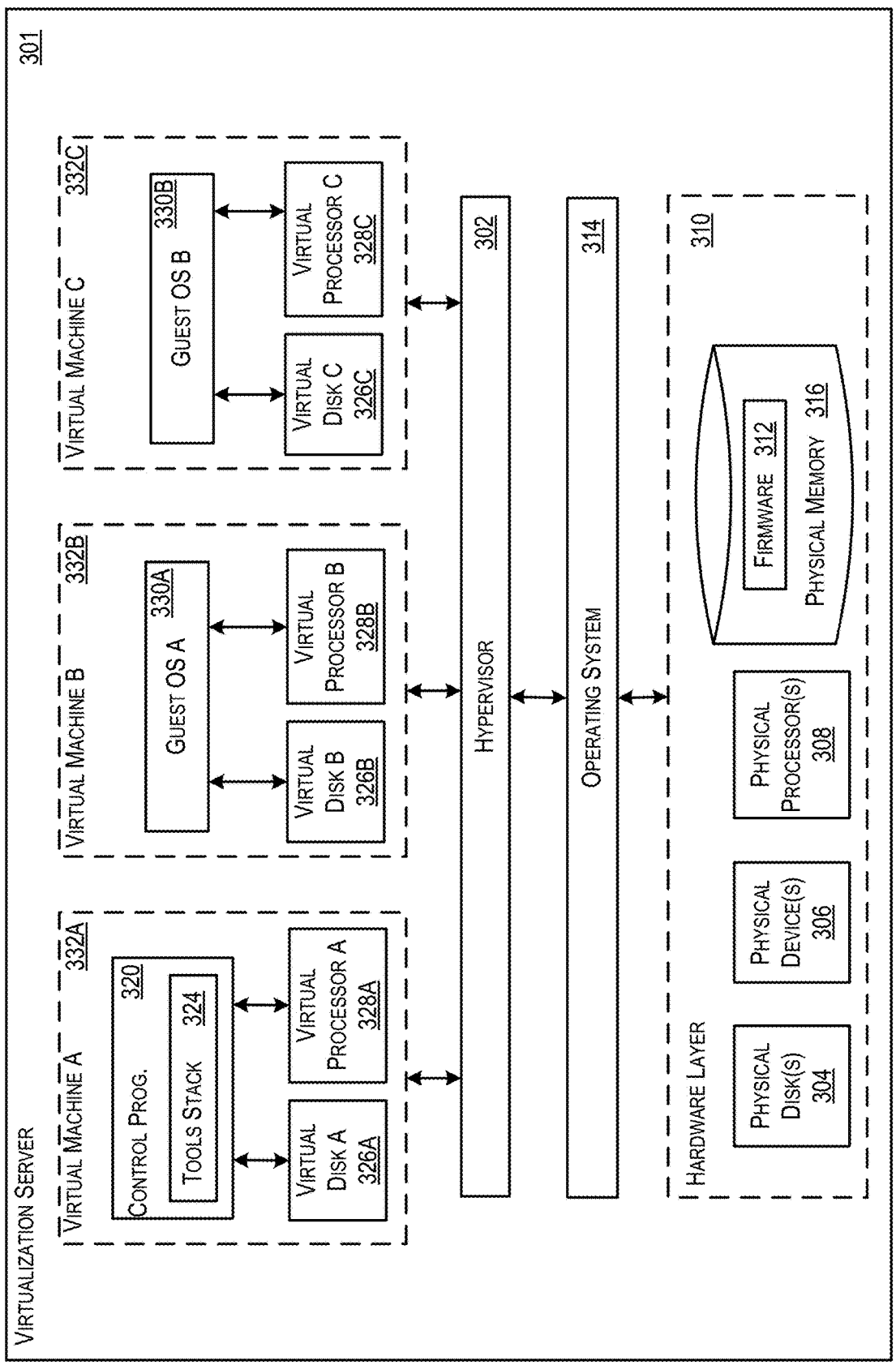
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
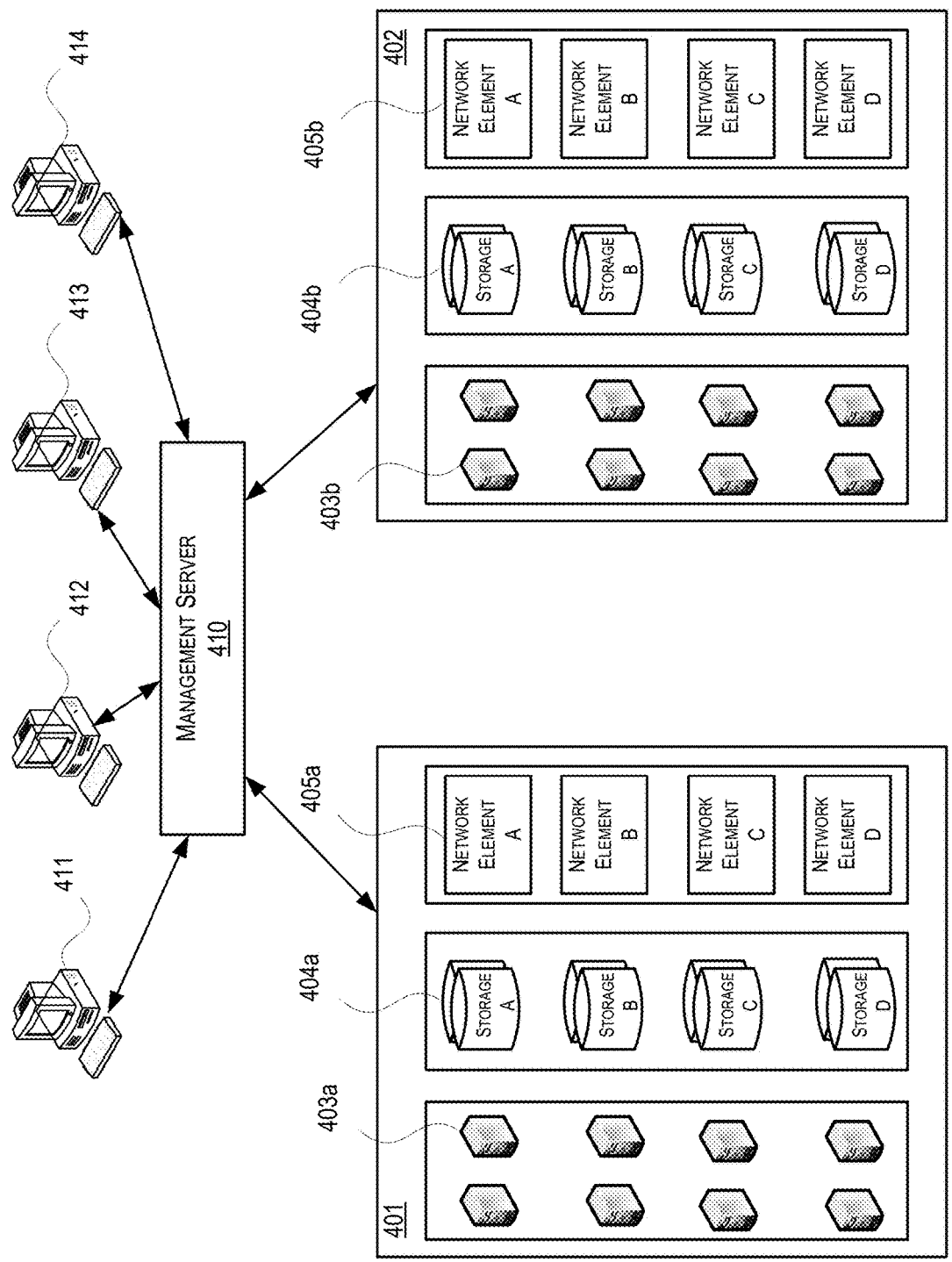
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Cloud Services Management

Figure 5:
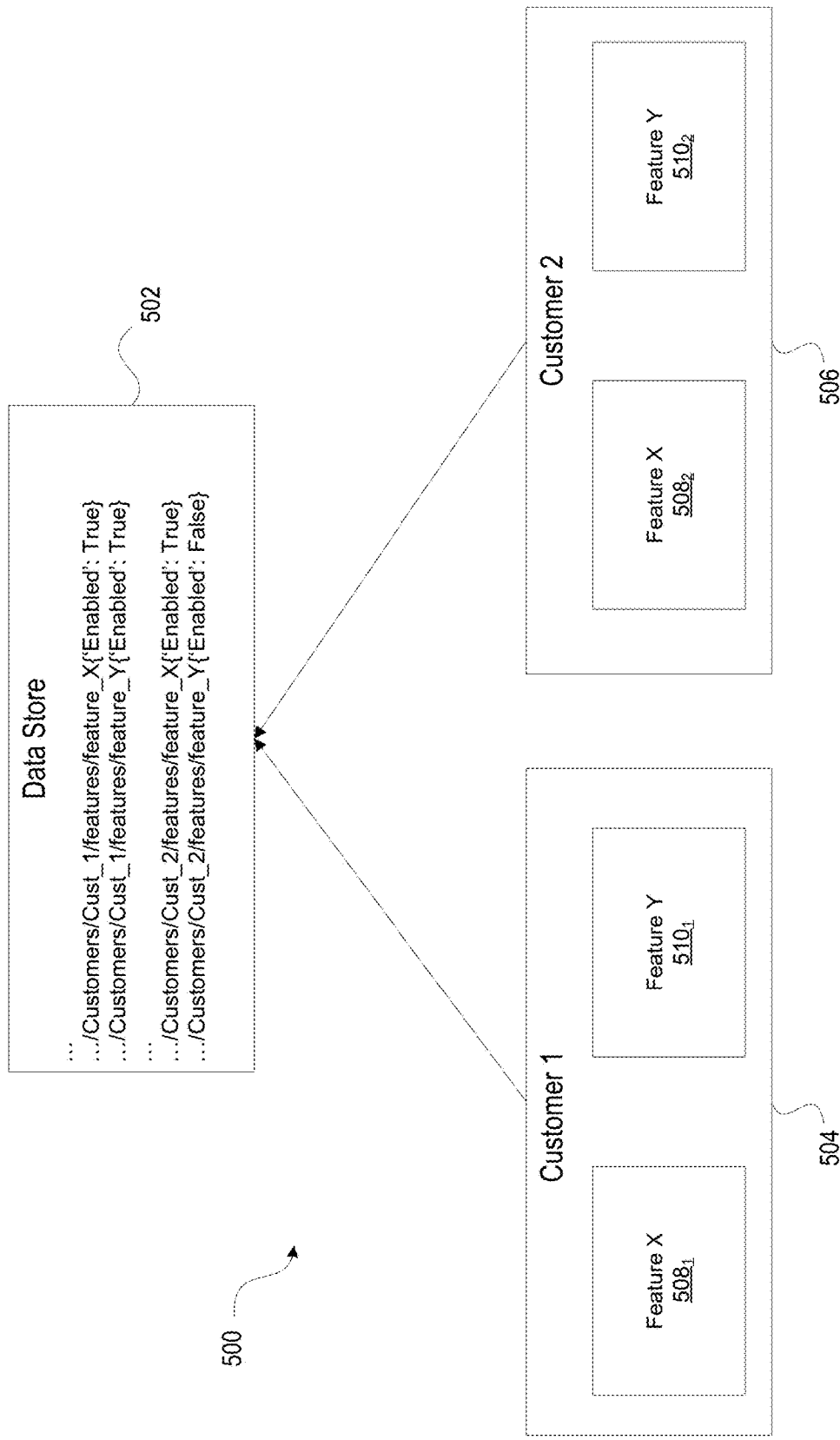
FIG. 5 depicts an illustrative cloud-based management system in accordance with one or more illustrative aspects described herein.

FIG. 5 illustrates an exemplary cloud-based system 500 employing management techniques relevant to this disclosure. As shown in FIG. 5, the system 500 may include a data store 502 and customers 504 and 506. According to some embodiments, the data store 502 may comprise a centralized data store that is part of, for instance, a centralized server such as management server 410 shown in FIG. 4. However, the data store 502 may also be a stand-alone component remote from any centralized server. Customers 504 and 506 may comprise one or more clients such as clients 411-414 shown in FIG. 4. While FIG. 5 only depicts two customers, this depiction is for the sake of simplicity and it should be understood that any number of customers may be present and part of system 500. Indeed, some embodiments may include upwards of thousands of customers.

As shown in FIG. 5, each customer has an instance of multiple features—shown as features X $508_1$ and $508_2$ (generically referred to as "feature X 508") and Y $510_1$ and $510_2$ (generically referred to as "feature Y 510"). Each of the features may be an instance of the feature unique to that customer. For instance, feature X $508_1$ and feature Y $510_1$ may be unique to customer 1 504 and feature X $508_2$ and feature Y $510_2$ may be unique to customer 2 506. As used herein, the term feature is meant to generally refer to any aspect of computer software and/or a computing resource, including: software updates, new and/or updated application functions or functionality, new and/or updated application settings, permission changes, and security updates, to name a few non-limiting examples.

Each of the features 508 and 510 can be enabled on a per-customer basis, according to various embodiments. The data store 502 may store information regarding the enablement of various features for each customer. For instance, as shown in FIG. 5, the data store 502 stores information indicating that both feature X 508 and feature Y 510 are enabled for customer 1 504 and that only feature X 508 is enabled for customer 2 506. Under this scheme, individual customers (e.g., customer 504 and 506) may query data store 502 to determine whether a particular feature is enabled for that customer and for their instance of the feature. It is also possible to have multiple levels of feature enablement. Such a scheme is depicted by FIG. 6.

Figure 6:
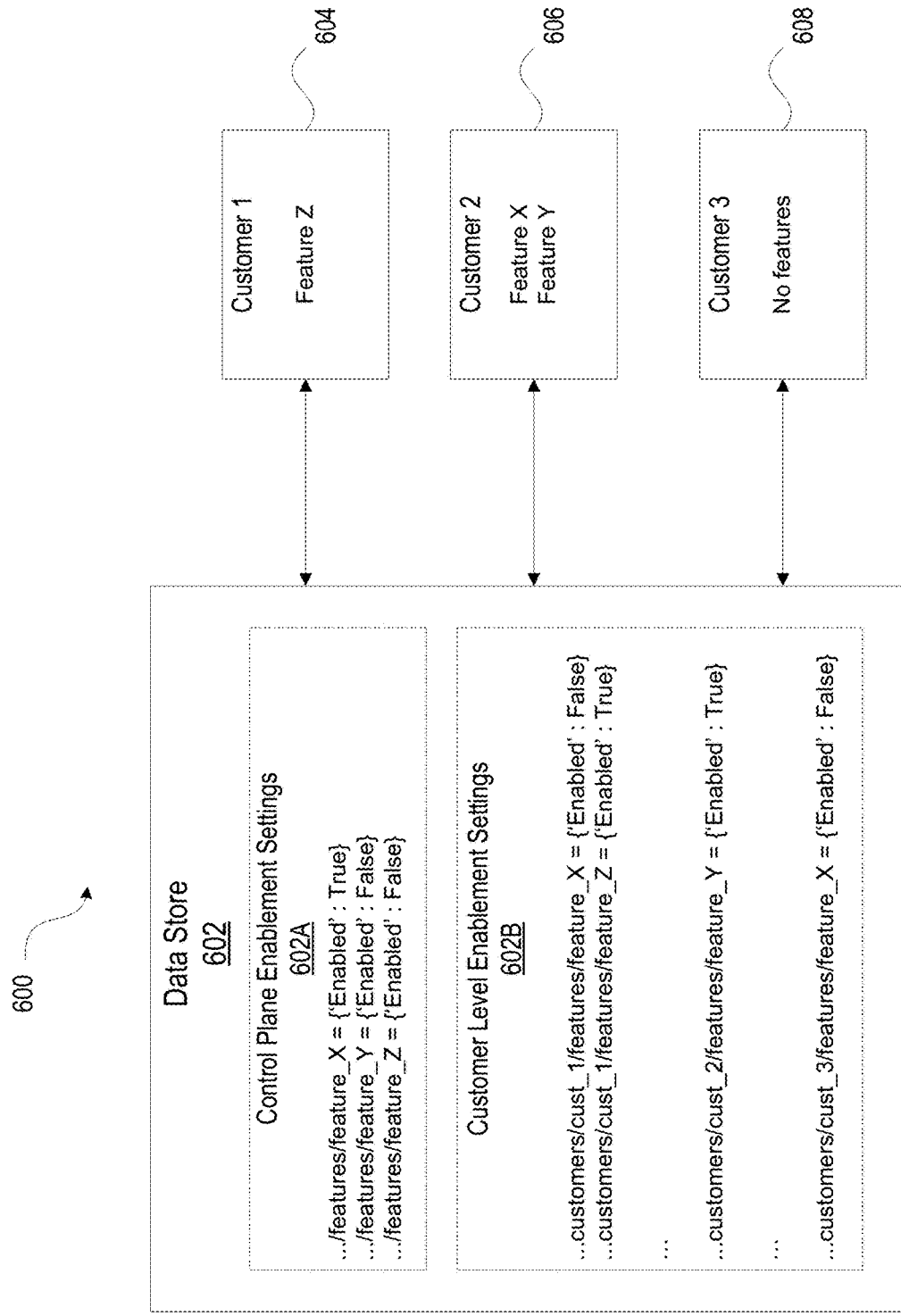
FIG. 6 depicts an illustrative cloud-based management system in accordance with one or more illustrative aspects described herein.

FIG. 6 illustrates an exemplary cloud-based system 600 similar to the system 500 depicted in FIG. 5. As shown in FIG. 6, the system 600, similar to system 500, may include a data store 602 and multiple customers—here, customers 604, 606, and 608. The data store 602 may comprise a centralized data store that is part of, for instance, a centralized server such as management server 410 shown in FIG. 4. However, the data store 602 may also be a stand-alone component remote from any centralized server. Customers 604 to 608 may comprise one or more clients such as clients 411-414 shown in FIG. 4. FIG. 6 only depicts three customers, but, as with FIG. 5, this depiction is for the sake of simplicity and it should be understood that any number of customers may be present and part of system 600.

Data store 602 may contain multiple levels of enablement settings arranged hierarchically. For instance, as shown, the data store 602 contains control plane enablement settings 602A and customer level enablement settings 602B. In some embodiments the control plane enablement settings 602A may comprise generally enablement settings for a plurality of features that are applicable to all customers (e.g., customers 604, 606, and 608.) Conversely, the customer level enablement settings 602B may be enablement settings that are only applicable to a specific customer. Though not shown, the data store 602 may also contain enablement settings for features according to various other characteristics. For instance, enablement settings could be set for an edition level of a software resource, a geographical location of a customer, by user (when, e.g., a customer comprises multiple users), to name a few non-limiting examples.

According to various embodiments, enablement settings can be arranged hierarchically in an arbitrary number of hierarchical levels. For instance, in some embodiments, settings may be controlled according to the following hierarchical levels (in descending order of importance):

1. Customer groups of size 1 (i.e., individual feature toggles for individual customers);
2. Customer groups specific to an edition;
3. New feature preference groups:
   a. Testing customers—i.e., those customers who have agreed to test new features;
   b. Customers who "opt in" or express an interest in early adoption of new features;
   c. A default group; and
   d. Customers who "opt out" of new features;
4. Customer groups by geographical region; and
5. Top level group containing all customers.

As noted above, the multiple levels of enablement settings (e.g., 602A and 602B) may be arranged so that they have a hierarchical relationship. For instance, in some embodiments, a setting on one level may take precedence over a setting on another level. This is illustrated in FIG. 6. As shown, the control plane enablement settings level 602A has enabled feature X but not feature Y and feature Z for all customers. The customer level enablement settings 602B, on the other hand, show feature X disabled for customer 1 604 and for customer 3 608. Additionally, the customer level enablement settings 602B show feature Y enabled for customer 2 606 and feature Z enabled for customer 1 604. Since the enablement settings 602A and 602B are arranged in a hierarchal relationship where the customer level enablement settings 602B take precedence over the control plane enablement settings 602A, this results in only feature Z being enabled for customer 1 604, features X and Y being enabled for customer 2 606, and no features enabled for customer 3 608. In this way, the enablement of various features may be controlled at an arbitrarily granular level based on the enablement settings stored in data store 602.

It is also possible to control the enablement of a feature based on a customer's membership in a customer group. This illustrated in FIGS. 7A-7D.

FIGS. 7A-7D depict a system 700 for managing cloud-based services according to various embodiments of the disclosure. The system 700 includes a cloud services server 702 and a plurality of clients organized into N groups (i.e., groups $704_1$, $704_2$, $704_3$, ..., $704_N$—collectively referred to herein as client groups 704.) The cloud services server may comprise, for instance, one or more servers similar to management server 401, according to various embodiments. The cloud services server 702 may also include roll out settings 706 that correspond to each client group 704. The roll out settings may include, among other things, enablement thresholds 708 for each of the groups 704. The enablement thresholds 708 identify a portion of a particular group for which a given feature will be enabled. In the embodiment depicted in FIGS. 7A-7D, the enablement threshold 708 is expressed as a percentage, but the enablement threshold need not be so limited. For ease of explanation, FIGS. 7A-7D focus on the roll out settings for just one feature—feature X—but, in practice the cloud services server 702 may include roll out settings for any number of features. And, indeed, in some embodiments, the cloud services server 702 may allow roll out settings 706 for all of the features used by clients of the system 700.

As shown, clients of the cloud services server 702 are divided into a plurality of groups 704. And each of the groups has a corresponding threshold value 708 for feature x in the roll out settings 706 managed by cloud services server 702. In some embodiments the clients are randomly divided into the groups 704. It is also possible, however, to assign clients into one of the groups 704 based on preferences of the clients or of the cloud services provider. For instance, if a cloud services provider is introducing a new feature to the cloud service, it may be desirable to organize the clients into groups depending on the bug tolerance of the individual clients in order to allow those with a high bug tolerance to receive the new feature quickly and those with a low tolerance to receive the new feature later after any bugs have been resolved. For instance, referring to the system depicted in FIGS. 7A-7B, group 1 $704_1$ could be assigned to a dedicated group of testing clients, group 2 $704_2$ could be assigned to clients who have "opted in" to receive early versions of new features and/or updates, group 3 $704_3$ could be assigned to clients who have expressed no preference (e.g., a "default" setting). The final group N $704_N$ could be assigned to clients who "opt out" of receiving early versions of new features or updates.

According to some embodiments, each of the groups 704 has a hierarchical relationship with each other so that members of a lower level group may only be enabled to for a particular feature once all members of a higher level group have been enabled for that feature. For instance, if such a scheme were applied to the embodiment of FIGS. 7A-7D, then feature x could only be enabled for group 2 clients $704_2$ clients once every one of the group 1 clients $704_1$ has been enabled.

Figure 7A:
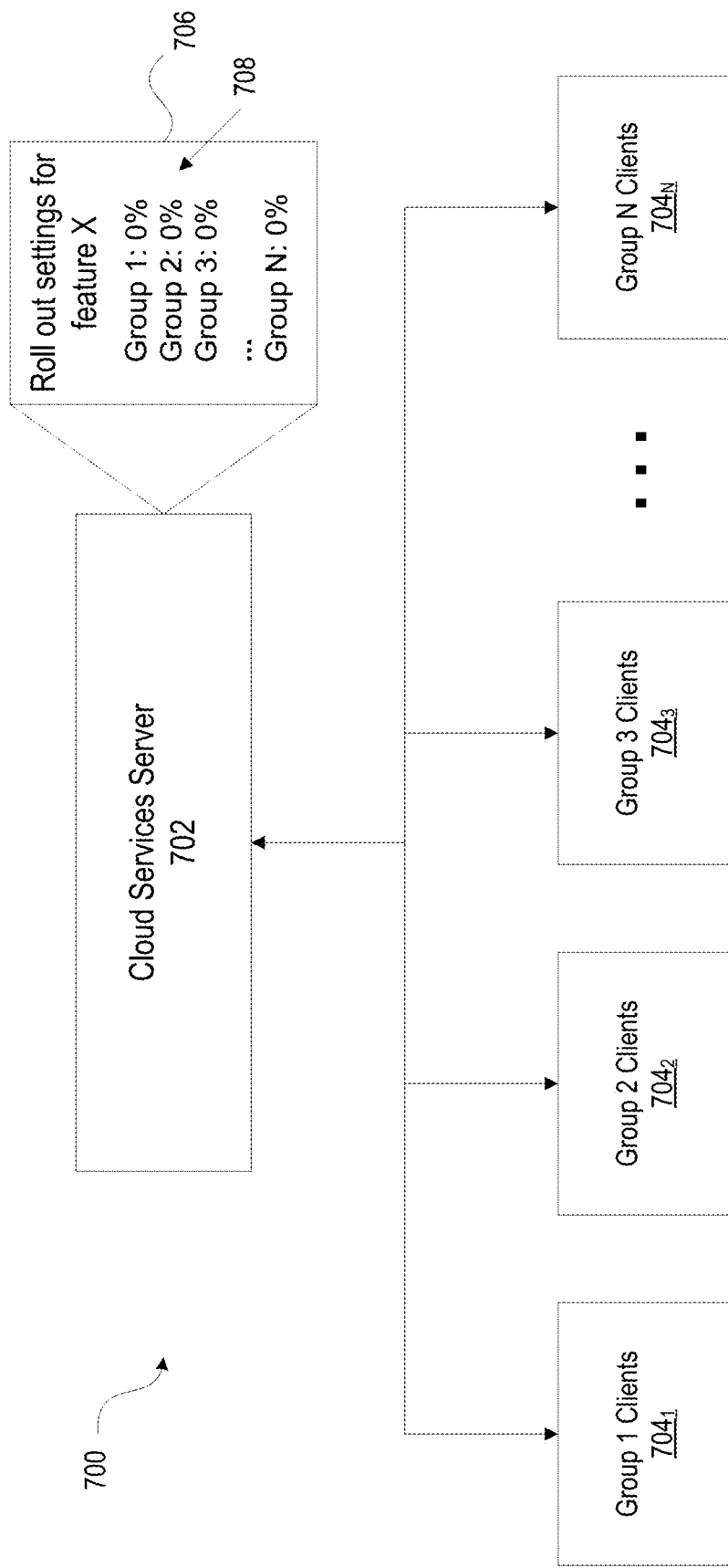
FIGS. 7A-7D depict an illustrative cloud-based management system in accordance with one or more illustrative aspects described herein.
Figure 7B:
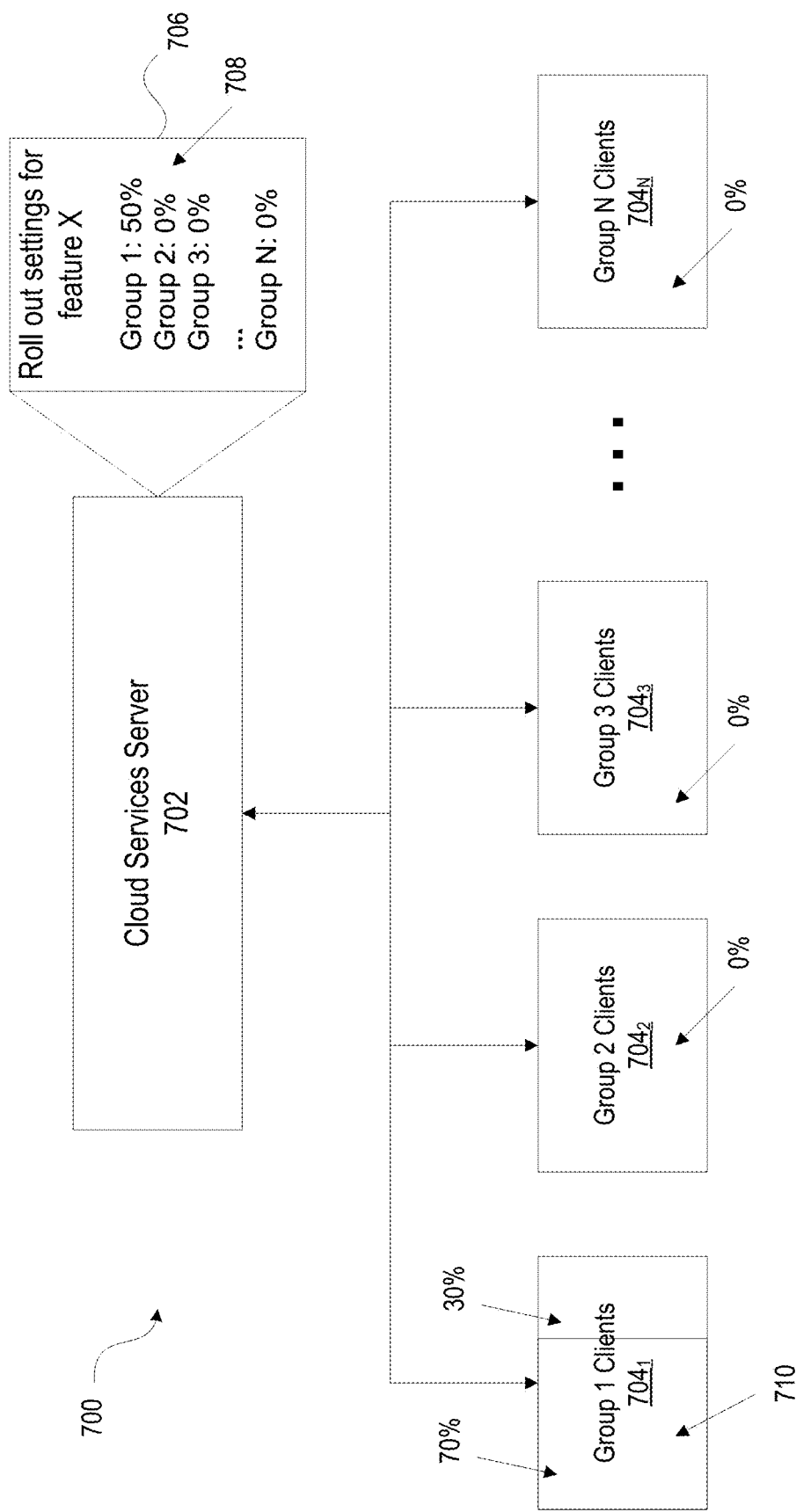

FIG. 7A depicts a situation where the roll out settings for feature X 706 have been set such that the enablement threshold 708 for each of the groups has been set to 0%. Accordingly, no client in any of the groups has had feature X enabled. In FIG. 7B, however, the enablement threshold 708 for group 1 has been set to 50% while the enablement threshold 708 for the remaining groups is still set to zero. Accordingly, FIG. 7B depicts that enabled clients 710 comprise approximately half of the group 1 clients $704_1$. In some embodiments, the number of clients for which a feature (e.g., feature x) is enabled may be less than the enablement threshold, but not more.

The determination of which clients of a member group get a given feature enabled may be made using a local calculation of an enablement value at the individual clients. For instance, in some embodiments, a client may calculate an enablement value using a hash function to operate on a unique identification value (e.g., a customer ID) and a unique identification value for the feature in question (e.g., a feature ID). The hash function can be designed to give a substantially even distribution of enablement values among the members of a given group. Additionally, by relying on a hash function of both a customer ID as well as a feature ID, the enablement value for a given client may differ from function to function. That is, a given customer may have a first enablement value for feature X and a different second enablement value for function Y. In such an embodiment, a client may calculate an enablement value for a feature using a pre-determined function such as a hash function and compare the enablement value to the roll out settings 706 for the particular feature. If the calculated enablement value is less than the threshold value 708 of the roll out settings 706 for the feature, then the feature (e.g., feature x) can be enabled for that client. If the enablement value is greater than the threshold value, then the feature can remain disabled for the client. While hash functions may be used in some embodiments, other embodiments may also other methods for enablement value calculation such as the use of random numbers or pre-assigned enablement values.

According to various embodiments, individual clients of a group may also perform their own enablement check. For instance, in the embodiments where clients calculate their own enablement value (e.g., using the hash discussed above), the individual clients may compare their calculated enablement value to an enablement threshold value to determine whether to enable a feature. This has the advantage that a client does not need to contact a remote server to determine its individual enablement status—it need only perform calculations locally. This results in improved performance and reduced latency.

Returning to the embodiment depicted in FIG. 7B, the individual clients of the group 1 clients $704_1$ can determine their individual enablement values. For instance, the hash function used by the group 1 clients $704_1$ may return an enablement value between 1 and 100. Each of the clients may then compare the calculated enablement value to the threshold value 708, which in this case is 50%. Accordingly, the group 1 clients $704_1$ with enablement values between 1 and 50 would get feature x enabled and for any client of the group 1 clients $704_1$ having an enablement value above 50 may have feature x remain disabled.

Figure 7C:
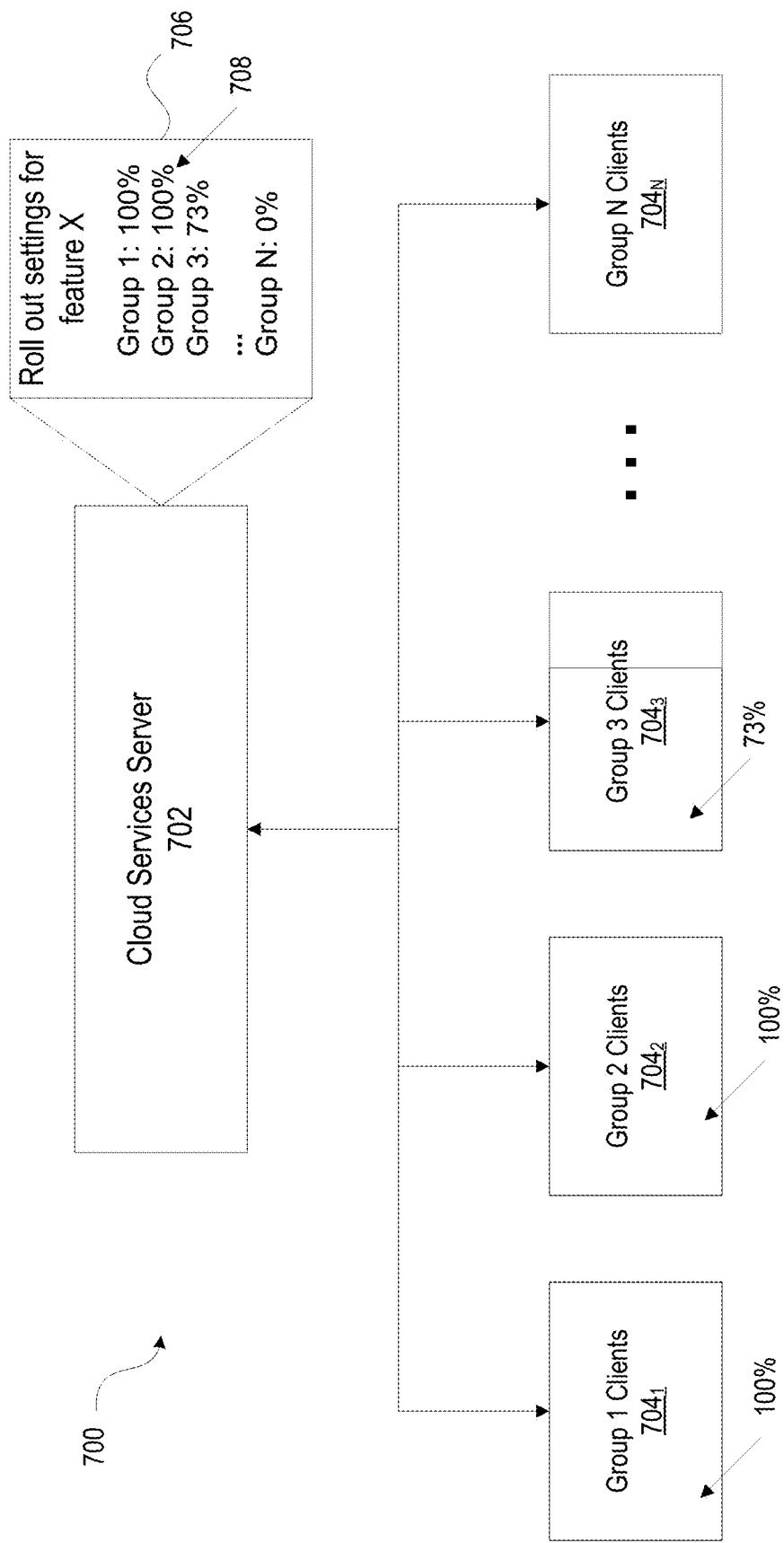
Figure 7D:
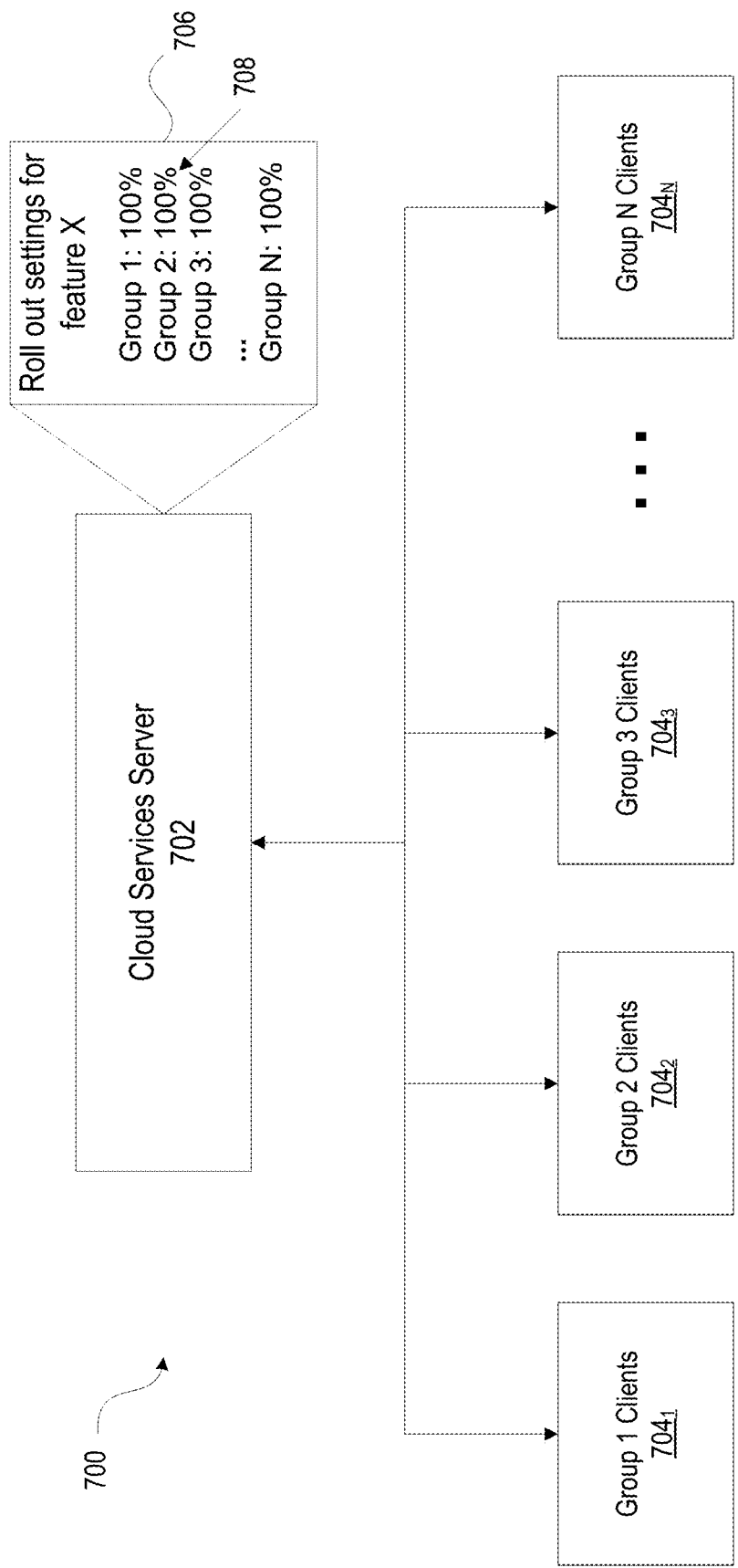

As shown in FIGS. 7A-7D, a given feature (e.g., feature x) may continue to be "rolled out" to the various groups 704 by adjusting the enablement threshold 708 in the roll out settings 706 for the feature. For instance, FIG. 7C depicts the scenario where 100% of both of the group 1 clients $704_1$ and group 2 clients $704_2$ have had feature x enabled and where approximately 73% of group 3 clients $704_3$ have had feature x enabled. As can be seen, this is accomplished by adjusting the corresponding enablement threshold 708 for each of the groups. Similarly, FIG. 7D depicts all of the groups 704 as having feature X enabled for 100% of all groups.

In some embodiments, it is also possible to "roll back" (i.e., disable) a feature that has previously been rolled out. In these embodiments, it may be necessary to roll back a feature for all members of lower-level group before rolling back the features of a higher-level group. For instance, in the embodiments shown in FIGS. 7A-7D, to roll back feature X for any of group 2 clients $704_2$, the feature would have to be first rolled back for all of the lower level groups (e.g., client groups $704_3$ to $704_N$).

Figure 8:
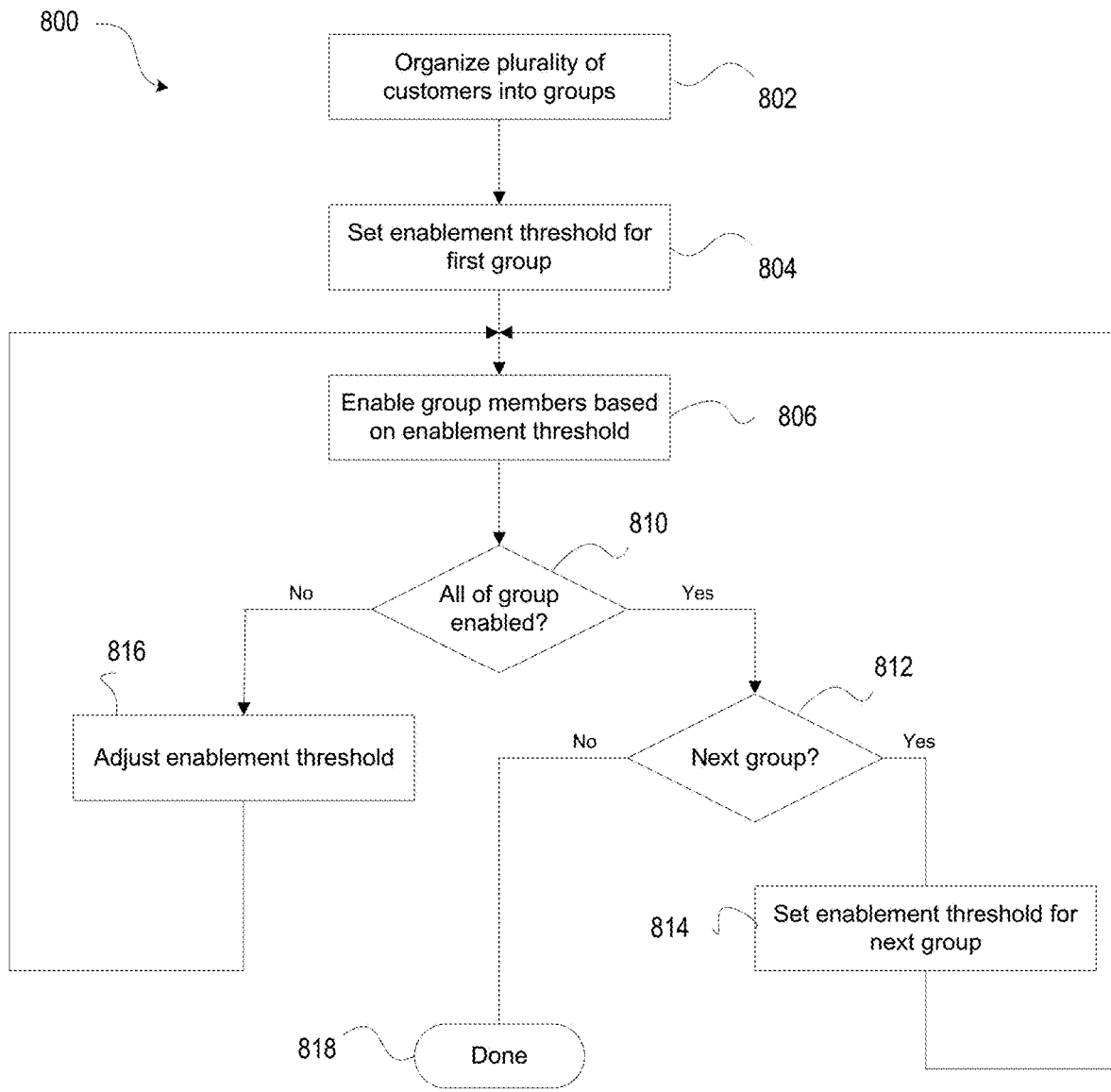
FIG. 8 is a flowchart illustrating a method of cloud-based management in accordance with one or more illustrative aspects described herein.

FIG. 8 is a flowchart depicting a method 800 of enabling or "rolling out" a feature (e.g., feature X) to a number of customers or clients according to various embodiments. For ease of explanation, method 800 will be described with respect to the embodiments depicted in FIGS. 1-7D, but it should be understood that method 800 is not limited to those particular embodiments.

As shown, the method 800 begins at 802 where a plurality of customers can be organized into one or more groups. The customers can be randomly assigned to groups (e.g., groups 704) in some embodiments, but in other embodiments, customers may be assigned to groups based on the individual preferences of the customer and/or a cloud services provider. As discussed above, in such embodiments, customers can be divided into groups based on a tolerance for bugs, geographic location, election of early adoption, or the like, to name a few non-limiting examples.

At 804, an enablement threshold (e.g., threshold 708) for a first group can be set by, for instance, a cloud services provider at, e.g., a cloud services server 702. The enablement threshold 708 can allow individual customers and/or clients to determine whether the particular feature is enabled for them, which occurs at 806.

At 806 the members of a particular group (e.g., one of groups 704) may compare their individual enablement values to the enablement threshold 708 that was set at 804. If the enablement value for a member of the group 704 is below the threshold, then the feature will be enabled for that member. Otherwise, for members of the group having enablement values above the threshold, the feature will remain disabled.

At 810, it may be determined whether all of a group is enabled for a particular feature. If not, then it is possible to adjust the enablement threshold for the group (e.g., by increasing it) to enable more members of the group at 816. After adjusting the enablement threshold at 816, the method 800 may loop back to 806 where further members of the group can be enabled based on the adjusted threshold.

If, at 810, all of a group is enabled, then it may be determined at 812 whether to enable a next group or whether there is a next group to be enabled. If so, then the method 800 proceeds to 814 where an enablement threshold for the next group can be set before proceeding to 806 where the feature is enabled for members of the next group based on the enablement threshold set for that group at 814. If, however, at 812 it is determined not to enable the feature for a next group or that there is no next group, then the method 800 may end at 818.

It should be appreciated that the transition from 806 to subsequent parts of method 800 may not be automatic. Indeed, the cloud services provider may wish to evaluate the efficacy of the rollout of a feature after enabling that feature for members of group at 806 before proceeding. And, only after determining that a feature was rolled out with relatively few errors or bugs, proceeding with method 800.

Figure 9:
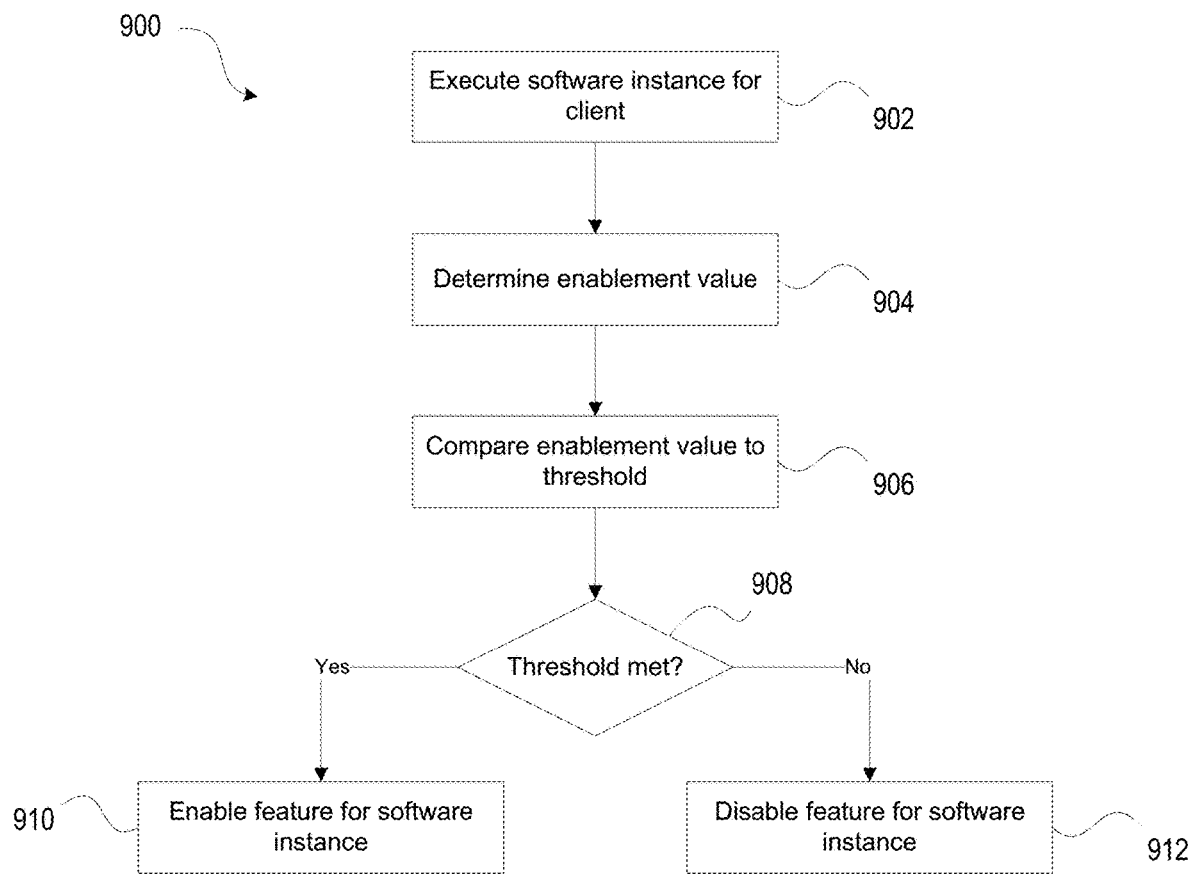
FIG. 9 is a flowchart illustrating a method of cloud-based management in accordance with one or more illustrative aspects described herein.

FIG. 9 is a flowchart illustrating a method 900 of enabling a feature for a particular client or customer according to various embodiments. As with FIG. 8, FIG. 9 will be described with respect to the embodiments depicted in FIGS. 1-7D, but it should be understood that method 900 is not limited to those particular embodiments.

As shown in FIG. 9, method 900 may begin with the execution of an instance of software containing a feature (e.g., feature X) to be rolled out for a customer and/or client (e.g., one of clients 411-414). At 904, the method may determine an enablement value associated with the feature. As discussed above, in some embodiments, a client may calculate an enablement value using a hash function to operate on a unique identification value (e.g., a customer ID) and a unique identification value for the feature in question (e.g., a feature ID). The hash function can be designed to give a substantially even distribution of enablement values among the members of a given group. Additionally, by relying on a hash function of both a customer ID as well as a feature ID, the enablement value for a given client may differ from function to function. In some embodiments, however, it is also possible for individual customers and/or clients to be assigned enablement values for a feature and or to generate one using a random number generator or the like.

At 906, the customer may compare the calculated enablement value to a threshold value set by, for instance, a cloud services provider on a cloud services server 702. In some embodiments, the individual customer may determine its enablement status by comparing the calculated enablement value to the threshold locally without contacting the cloud services provider. If the enablement value is below the threshold, then the method 900 proceeds to 910 where the feature is enabled for the client and software instance. If, however, the enablement value is above the threshold, then the method 900 proceeds to 912 and the feature is either disabled or remains disabled for the customer.

In some embodiments, it is possible to selectively enable a feature based on characteristics that apply to individual customers and/or groups of customers of a cloud-based system. Differing characteristics might have differing levels of granularity and more granular characteristics may trump less granular ones. By way of example, a feature could be enabled for all customers, customers who have purchased a specific edition of the software that the feature is part of, or on a per-customer basis. In such a case, the customer-level enablement characteristic would take precedence over the edition-level enablement characteristic, which would take precedence over the all customers level enablement characteristic. This is described more with respect to FIG. 10, below.

Figure 10:
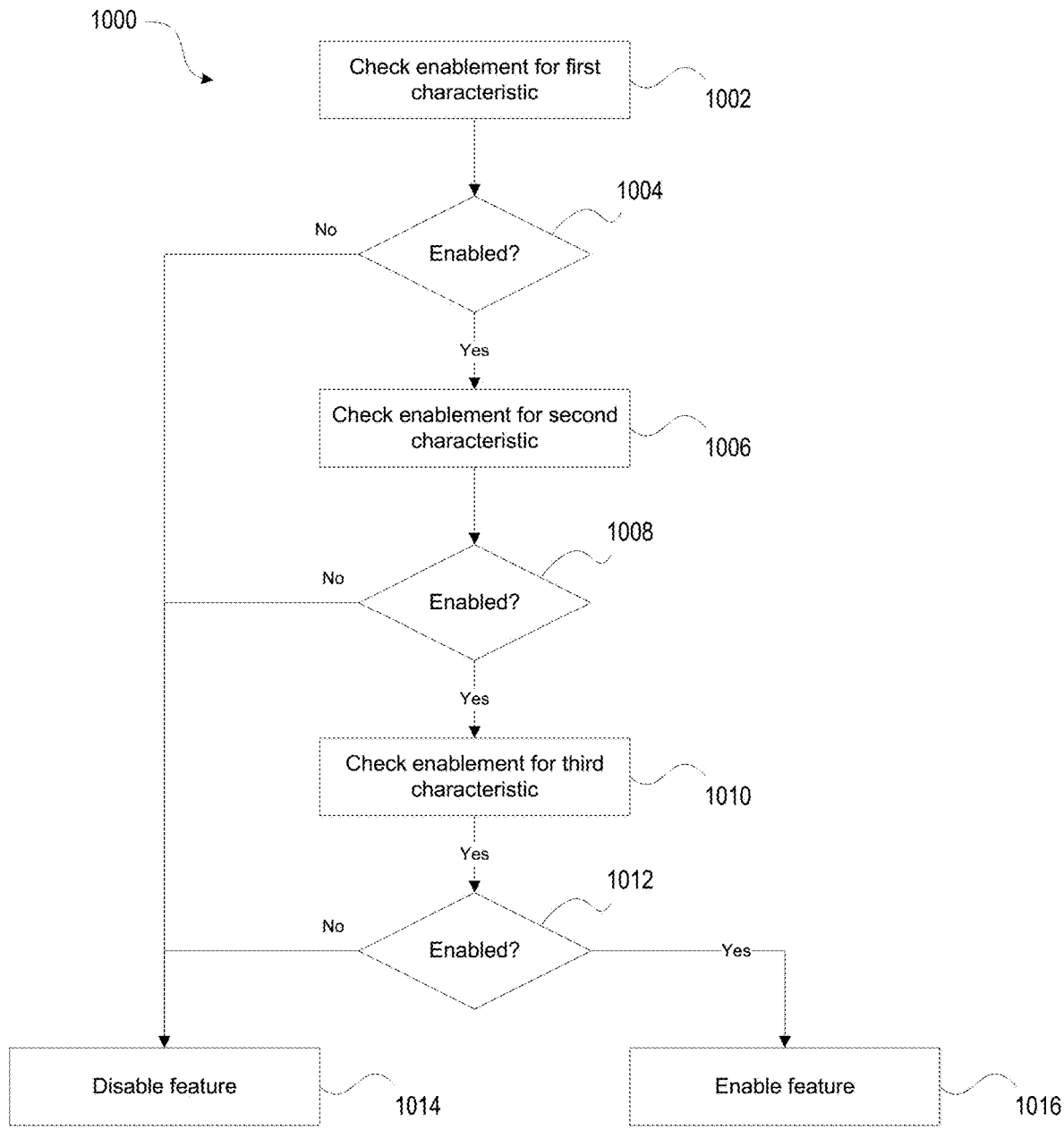
FIG. 10 is a flowchart illustrating a method of cloud-based management in accordance with one or more illustrative aspects described herein.

FIG. 10 is a flowchart illustrating a method 1000 of selectively enabling a feature based on multiple characteristics. As with FIGS. 8 and 9, FIG. 10 will be described with respect to the embodiments depicted in FIGS. 1-7D, but it should be understood that method 1000 is not limited to those particular embodiments.

Method 1000 begins at 1002, where enablement can be determined for a first characteristic. Continuing with the example, above, this may constitute determining whether the feature is enabled in general. Additionally, this step could proceed according to method 900 to determine if the feature has been enabled based on roll out enablement thresholds 708 and the enablement value of the particular customer. If, at 1004, it is determined that the feature is not enabled for the first characteristic, then the method 1000 proceeds to 1014 where the feature is either disabled or remains disabled.

If, however, at 1004 it is determined that the feature is enabled for the first characteristic, then method 1000 proceeds to 1006 where the enablement for a second feature is checked. Continuing with our example, above, this could take the form of determining whether a feature is enabled for a particular edition of the software it is a part of. By way of example, consider the case where regular and premium versions of software are offered. A cloud services provider may wish to only enable a particular feature for customers who have purchased the premium version of the software and keep the feature disabled otherwise. At 1008, if the feature is not enabled for the second characteristic, the method 1000 proceeds to 1014 where the feature is either disabled or remains disabled.

If, at 1008, the method 1000 determines that the feature is enabled for the second feature, then the method 1000 proceeds to 1010, where it checks the enablement characteristic for a third characteristic. Again, continuing with the example above, the third characteristic may comprise the most granular characteristic, such as enablement on an individual customer level. Indeed, some customers may wish to disable a feature even though it would otherwise be enabled based on, e.g., the edition level of the software they purchased. In such a case, the customer level characteristic may take precedence over the more granular level characteristics. Accordingly, at 1012, it is determined whether the feature is enabled for the third characteristic. If not, then the method proceeds to 1014, where the feature is either disabled or remains disabled. If, however, the it determines that the feature is enabled for the characteristic, then the feature is enabled at 1016.

As a variation of the method 1000 shown in FIG. 10, it is also possible to selectively enabled features based on characteristics of different granularity, but in the reverse order. That is, where method 1000 was described as assessing increasingly granular characteristics, it would be also possible to assess the characteristics from most granular to least granular. Additionally, in some embodiments, the most granular characteristic (e.g., the customer level characteristic) may take precedence over all other characteristics regardless of whether the feature has been previously disabled. For instance, in the example discussed above, the customer level characteristic may be allowed to enabled a feature even if that feature would be determined to be disabled at either of 1004 or 1008.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   enabling a feature of an instance of a software component by:
   organizing user accounts into a plurality of hierarchically organized groups;
   based on determining that the feature is enabled for a first number of user accounts in a first group of the plurality of hierarchically organized groups, and that the first number of the user accounts in the first group is less than a total number of the user accounts in the first group, adjusting a threshold associated with the first group;
   based on the adjusted threshold associated with the first group, enabling the feature for one or more additional user accounts in the first group;
   determining a value for a user account in a second group of the plurality of hierarchically organized groups, wherein the value is unique among one or more other values for one or more other user accounts in the second group, and wherein the second group is at a lower hierarchical level than the first group; and
   based on determining that the feature is enabled for the total number of the user accounts in the first group:
   enabling, based on a comparison of the value for the second group with a threshold associated with the second group, the feature for the user account in the second group; and
   enabling, based on a comparison of the one or more other individual values with the threshold associated with the second group, the feature for a second number of user accounts in the second group, wherein the second number corresponds to the threshold associated with the second group.

2. The method of claim 1, wherein the enabling the feature for the user account in the second group comprises determining that the value is below the threshold associated with the second group.

3. The method of claim 2, further comprising:
   adjusting the threshold associated with the second group; and
   enabling the feature for an additional user account in the second group based on a comparison of a value associated with the additional user account to the adjusted threshold associated with the second group.

4. The method of claim 3, further comprising:
   re-adjusting the threshold associated with the second group; and
   disabling the feature for the additional user account in the second group based on a comparison of the value for the additional user account to the re-adjusted threshold associated with the second group.

5. The method of claim 1, wherein the value for the second group comprises a randomly generated number.

6. The method of claim 1, wherein the value for the second group comprises a hash of an identification for a user account in the second group and an identification of the feature.

7. The method of claim 1, wherein the feature must be enabled for each of the one or more user accounts in a higher level group in the plurality of hierarchically organized groups before the feature can be enabled for any of the one or more user accounts in a lower level group in the plurality of hierarchically organized groups.

8. The method of claim 1, further comprising:
   querying a remote system to determine whether the first number is equal to the total number of the user accounts in the first group.

9. The method of claim 1, wherein the enabling the feature for the second number of the user accounts in the second group comprises:
  comparing the first number of the user accounts in the first group to the total number of the user accounts in the first group; and
  in response to the first number of the user accounts in the first group not being equal to the total number of the user accounts in the first group:
    disabling the feature for the user account in the second group;
    adjusting the threshold associated with the first group;
    determining an second adjusted number of the user accounts in the first group for which the feature is enabled; and
    comparing the adjusted number to the total number of the user accounts in the first group; or
  in response to determining that the first number of the user accounts in the first group is equal to the total number of the user accounts in the first group,
    enabling the feature for the user account in the second group when the value is equal to or below the threshold associated with the second group; or
    disabling the feature for the user account in the second group when the value is above the threshold associated with the second group.

10. The method of claim 9, further comprising:
  based on the comparing the adjusted number of the user accounts in the first group to the total number of the user accounts in the first group:
    enabling the feature for the user account in the second group when the value is equal to or below the threshold associated with the second group; or
    disabling the feature for the user account in the second group when the value is above the threshold associated with the second group.

11. The method of claim 1, further comprising determining an edition of the instance of the software component.

12. The method of claim 1, further comprising determining whether a customer associated with the instance of the software component is a user account in one of the plurality of hierarchically organized groups.

13. The method of claim 2, wherein the threshold associated with the second group identifies a proportion of the user accounts in the second group for which the feature may be enabled.

14. The method of claim 1, further comprising disabling the feature for the one or more user accounts in the second group by disabling the feature for user accounts in a third group of the plurality of hierarchically organized groups, wherein the third group is at a lower hierarchical level than the second group.

15. The method of claim 1, further comprising:
  based on the comparison indicating the value does not satisfy the threshold associated with the second group:
  disabling, for the user account in the second group and for the instance of the software component, the feature; and
  adjusting, in response to a comparison of the first number of user accounts in the first group to the total number of the user accounts in the first group, the threshold associated with the second group.

16. An apparatus, comprising:
  one or more processors configured to:
  enable a feature of an instance of a software component by:
  organizing user accounts into a plurality of hierarchically organized groups;
  based on determining that the feature is enabled for a first number of user accounts in a first group of the plurality of hierarchically organized groups, and that the first number of the user accounts in the first group is less than a total number of the user accounts in the first group, adjusting a threshold associated with the first group;
  based on the adjusted threshold associated with the first group, enabling the feature for one or more additional user accounts in the first group;
  determining a value for a user account in a second group of the plurality of hierarchically organized groups, wherein the value is unique among one or more other values for one or more other user accounts in the second group, and wherein the second group is at a lower hierarchical level than the first group; and
  based on determining that the feature is enabled for the total number of the user accounts in the first group:
  enabling, based on a comparison of the value for the second group with a threshold associated with the second group, the feature for the user account in the second group; and
  enabling, based on a comparison of the one or more other individual values with the threshold associated with the second group, the feature for a second number of user accounts in the second group, wherein the second number of the user accounts in the second group corresponds to the threshold associated with the second group.

* * * * *